TELEPHONE SWITCHING CIRCUIT

Filed Dec. 4, 1959 3 Sheets-Sheet 1

INVENTOR
R. W. KETCHLEDGE
BY Henry M. Bissell
ATTORNEY

INVENTOR
R. W. KETCHLEDGE
BY Henry M. Bissell
ATTORNEY

INVENTOR
R. W. KETCHLEDGE
BY Henry M. Bissell
ATTORNEY 3,005,876
Patented Oct. 24, 1961

3,005,876

TELEPHONE SWITCHING CIRCUIT

Raymond W. Ketchledge, Whippany, N.J., assignor to Bell Telephone Laboratories, Incorporated, New York, N.Y., a corporation of New York Filed Dec. 4, 1959, Ser. No. 857,283
16 Claims. (Cl. 179—18)

This invention relates to telephone switching networks and more particularly to such a network employing a plurality of bistable remanently magnetic switching devices.

The use of electromechanical switching devices or relays in telephone switching systems is well known. In general, these relays possess many of the desirable characteristics of a switching device such as a high ratio of open circuit to closed circuit resistance, separation of control and switching paths, long life, reliability and economy. The trend of recent developments, however, has been toward a reduction in the time required to establish connections within a switching network. It is desirable that a network be devised which may be controlled by pulses of a few microseconds in duration, hereinafter referred to as electronic pulses. Most priorly known switching relays, because they depend upon the movement of a mechanical element, have been too slow in response for general application in such networks.

A relay which is capable of responding to electronic pulses is disclosed in A. Feiner et al. application Serial No. 824,222, filed July 1, 1959. The disclosed relay utilizes a bistable remanently magnetic element which is itself responsive to electronic pulses to control the contact condition of an associated magnetically responsive mechanical switch. The relay of Feiner et al. employs for its switch a magnetic reed switch of the type described in "Development of Reed Switches and Reed Relays" by O. M. Hovgaard et al., vol. 34, Bell System Technical Journal, page 309 ff. This is referred to as a "soft" magnetic reed switch because the reeds are of a material having a high permeability to magnetic flux but exhibiting a low magnetic remanence.

Another relay exhibiting the desirable characteristics of the Feiner et al. relay is disclosed in R. L. Peek, Jr. application Serial No. 847,919, filed October 22, 1959. The Peek relay employs a "hard" magnetic reed switch having reeds with a high magnetic remanence, the remanent magnetization states of which are controlled directly by electronic pulses on associated control windings. Other relay structures exhibiting the desirable characteristics possessed by the above-mentioned devices are disclosed in applications Serial No. 847,918 of T. N. Lowry, filed October 22, 1959, and Serial No. 847,935 of J. T. L. Brown, filed October 22, 1959.

While these devices are responsive to electronic pulses, and therefore are suitable for inclusion as the interconnecting element in an electronic switching network, they still include a mechanical element having a response time greater than the duration of the control pulses. Normally, the condition of the switch contacts corresponds to the magnetic state of the device and can thus be employed to ascertain this state. This indication of the state of the device cannot be relied on, however, during the interval before the switch contacts respond to a change of magnetization state.

It is, therefore, an object of this invention to provide an improved telephone switching network. More specifically, it is an object of this invention to provide such a network including mechanical switching devices which are magnetically controlled by bistable remanently magnetic members.

It is a further object of this invention to provide in such a network an arrangement independent of the mechanical contact members for ascertaining the remanent magnetization state of the included switching devices.

One specific embodiment of my invention comprises a telephone switching network including a plurality of relays of the general type disclosed in the above-mentioned Feiner et al. application. These relays have an additional winding associated therewith to provide an output signal when the magnetization state of the associated portion of the relay is changed. The contacts of these relays control the connections between a plurality of telephone subscriber sets. Equipment is provided to select particular relays of the switching network in order to establish a talking path between a predetermined pair of subscriber sets.

In accordance with my invention, a detecting circuit is connected to the readout windings of the respective network relays. This circuit is arranged to detect the condition of the respective relays when they are switched by the control circuitry. When a subscriber talking path is to be established, the relays available for setting up the requisite connections may be pulsed by the control circuitry to determine the magnetization state of the relays. Available idle relays may then be operated to establish the desired connections.

The magnetically responsive mechanical switches employed in the embodiment of my invention have remanently magnetic members which can be set in a selected remanent magnetization state in a small fraction of the time required for the switch contacts to respond. In fact, it is possible to reverse the remanent magnetization state of such a switching device a number of times in rapid succession without disturbing the condition of the switch contacts. This characteristic of these switches is utilized in accordance with an aspect of my invention to provide a simplified control arrangement for selecting a subscriber talking path through a telephone switching network.

Specifically, in accordance with my invention, the control circuitry determines the magnetization state of the relays by pulsing particular groups of relays to produce the released contact state. If any one of the pulsed relays was priorly operated, the change of its magnetization state generates a signal on its readout winding which is detected by the detection circuit. Upon receiving such a signal, the detection circuit causes the control circuitry to restore the prior magnetization state of that relay before the associated switch contacts are disturbed. Thus, in accordance with my invention, provision is made against breaking into established talking paths through the network during the establishment of additional paths. Furthermore, in accordance with a particular aspect of my invention, an indication of the ultimate contact state of a relay is provided without having to wait until the relay contacts have had time to respond to a recently established magnetization state.

It is a feature of this invention to provide, in a switching network of electromechanical switching relays, an indication of the ultimate state of a particular relay prior to the assumption of that state by the relay contacts.

It is another feature of this invention that a readout signal indicating the magnetization state of a relay be used to energize the control circuitry of a switching network including the relay so that an alternate switch may be selected.

A further feature of this invention is the determination of a relay state by establishing the magnetization condition corresponding to release of the relay, detecting a magnetization reversal if such occurs, and restoring the previously existing magnetization condition of the relay without disturbing the relay contacts.

It is an additional feature of this invention to employ, during the path selection process, indications of the magnetization conditions of electromechanical relays incorporated in a telephone switching network to avoid interrupting an already existing subscriber talking path.

A complete understanding of this invention and of these and other features thereof may be gained from the following detailed description when read in connection with the accompanying drawing, in which.

Figure 1:
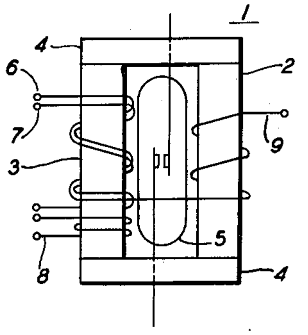
FIG. 1 is a representation of a relay employed in one specific embodiment of the invention.

FIG. 1 depicts a particular relay structure employed in one specific embodiment of a switching network in accordance with my invention. In this figure, the relay 1 has a pair of legs 2 and 3 of a magnetic material exhibiting a plurality of stable remanent magnetization states. Magnetic members 4 of a magnetically permeable material connect the corresponding ends of the legs 2 and 3 to each other and to the terminals of a magnetic reed switch 5. Leg 3 has three current carrying coils 6, 7, and 8 wound about it while the leg 2 has a single coil 9 surrounding it. The coils 7 and 9 are connected in series as one control winding of the relay 1.

Figure 2A:
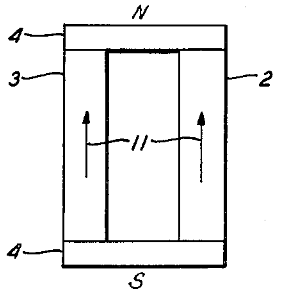
FIGS. 2A and 2B depict different flux conditions for a portion of the relay depicted in FIG. 1.
Figure 2B:
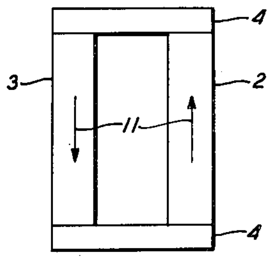

FIGS. 2A and 2B represent the magnetic portion of the relay 1 of FIG. 1 with arrows 11 being shown to indicate the polarities of the respective remanent magnetization states in the legs 2 and 3. In FIG. 2A, the arrows 11 are shown pointed in the same direction and for this magnetization condition opposite magnetic poles are produced at the ends of the structure, as indicated by the letters N and S. This magnetization state corresponds to the operate condition of the switch 5 of FIG. 1 since the magnetic poles N and S direct magnetic flux through the switch 5 and cause it to operate. In FIG. 2B the arrows 11 are shown directed in opposite directions. In this remanent magnetization state the magnetic flux circulates around the external magnetic circuit. Accordingly, the external poles are eliminated and the switch 5 of FIG. 1 is released.

The relay depicted in FIG. 1 is designed for operation by coincident control signals. Signals of half the amplitude required to switch the remanent magnetization of the leg 3 are applied concurrently to the upper left-hand terminals of the coils 6 and 7. Current in the coil 7 also flows through the coil 9. It will be noted that the contact state of the relay will be changed when the magnetization of only one leg of the relay 1 is reversed. Accordingly, during fabrication of the device the leg 2 is strongly magnetized in the upward direction. Thereafter, its magnetization state is unchanged. The winding 9 is included merely to insure that partial reversals of magnetization do not occur in the leg 2 during the establishment of the upwardly directed magnetization state in the leg 3. When the magnetization of the leg 3 is established in the downward direction so as to release the switch contacts, flux linking the leg 2 is in a direction to increase the existing magnetization therein. Accordingly, it is not necessary then to develop an electromagnetic field at the leg 2, and release of the switch is effected by applying a single signal to the winding 6 of the proper polarity and amplitude to produce magnetization reversal of the leg 3.

During magnetization reversal of the leg 3, a signal is generated in the readout coil 8, wound thereon. It will be noted that, since the coil 7 is not energized during the switch release step, a similar signal will be generated in the coil 7 at this time. These signals are utilized in respective embodiments of my invention in accordance with an aspect thereof which will be described more fully hereinafter.

Figure 3:
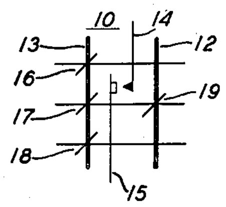
FIG. 3 is a schematic representation of the relay of FIG. 1.

FIG. 3 depicts a symbolic representation 10 of the relay 1 of FIG. 1 in accordance with the mirror symbol convention described by M. Karnaugh in "Pulse-Switching Circuits Using Magnetic Cores," vol. 43, No. 5, Proceedings of the I.R.E., page 570. In FIG. 3 the vertical lines 12 and 13 represent the legs 2 and 3, respectively, of the relay 1 of FIG. 1, the elements 16, 17, 18, and 19 correspond to the coils 6, 7, 8, and 9, respectively, and the horizontal lines represent connections to the respective coils. The contact members of the switch 5 of FIG. 1 are represented by the elements 14 and 15 of FIG. 3. Although described with reference to the relay 1 of FIG. 1, the symbol depicted in FIG. 3 is not intended to be limited thereto but may represent any equivalent structure employing a pair of remanently magnetic members to control a pair of contacts.

It should be emphasized that the device depicted in FIG. 1 can be switched in two steps. Electronic control pulses of a few microseconds duration applied to windings 6, 7, and 9, as described, establish one or the other of the magnetic flux conditions depicted in FIGS. 2A and 2B. In a successive time interval which extends to a few milliseconds, the mechanical response time of the associated switch 5, the switch contacts move to assume a condition which corresponds to the particular flux condition priorly established. During this second time interval it is quite possible to reverse the magnetization state of the device a number of times before the switch 5 responds to the final magnetic flux condition of the device.

In a telephone switching network it is imperative that interconnections with existing talking paths be avoided during the setting up of other such paths. In the switching network of my invention this provision is taken care of by, in effect, interrogating the control windings of the particular switches making up the network to determine whether the switches are already in use or not. The state of a particular switch is advantageously ascertained without disturbing the switch contacts themselves. This aspect of my invention is detailed in the description of FIGS. 4 and 5 which follows.

Figure 4:
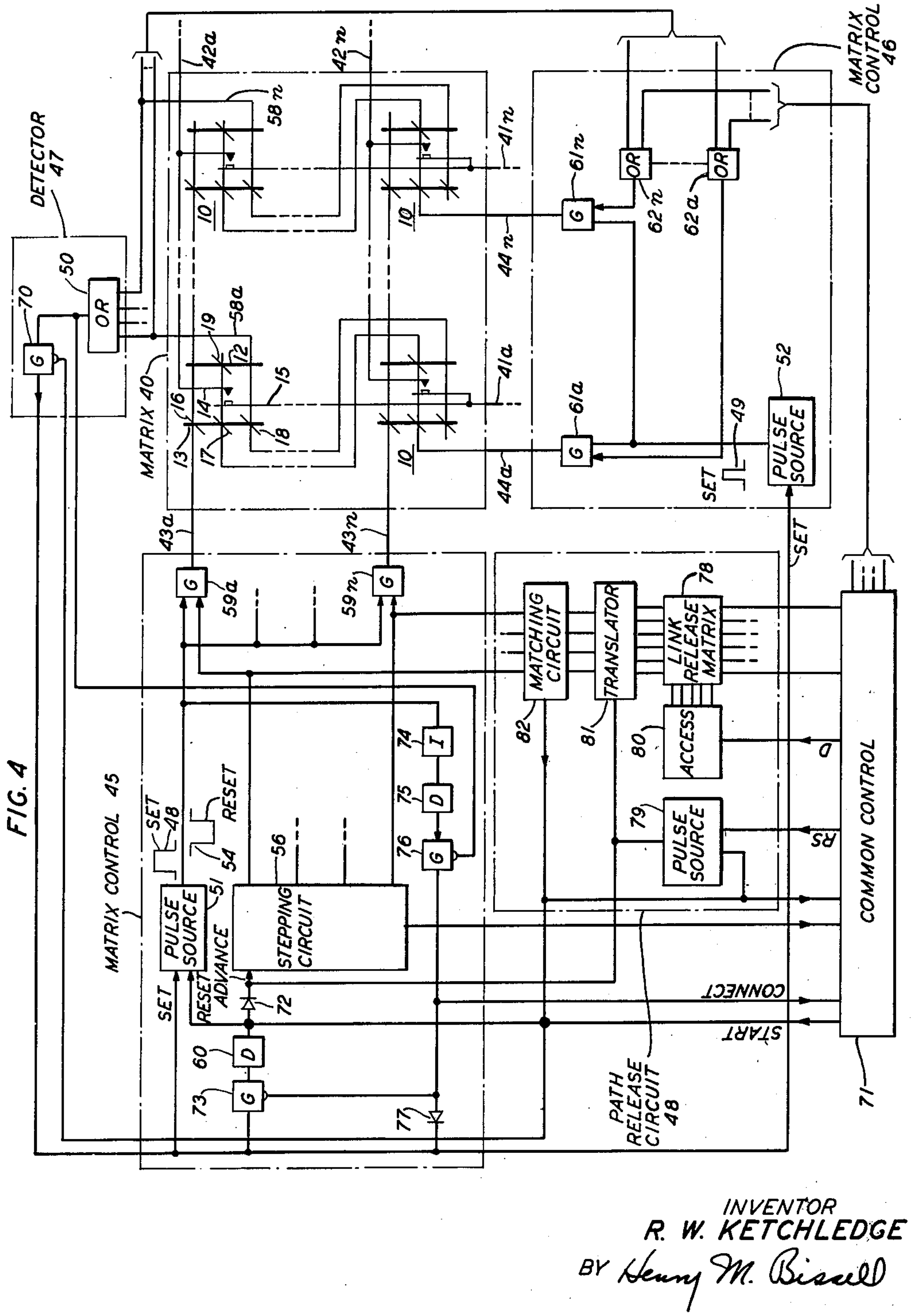
FIG. 4 is a diagram of a particular portion of one specific embodiment of my invention.
Figure 5:
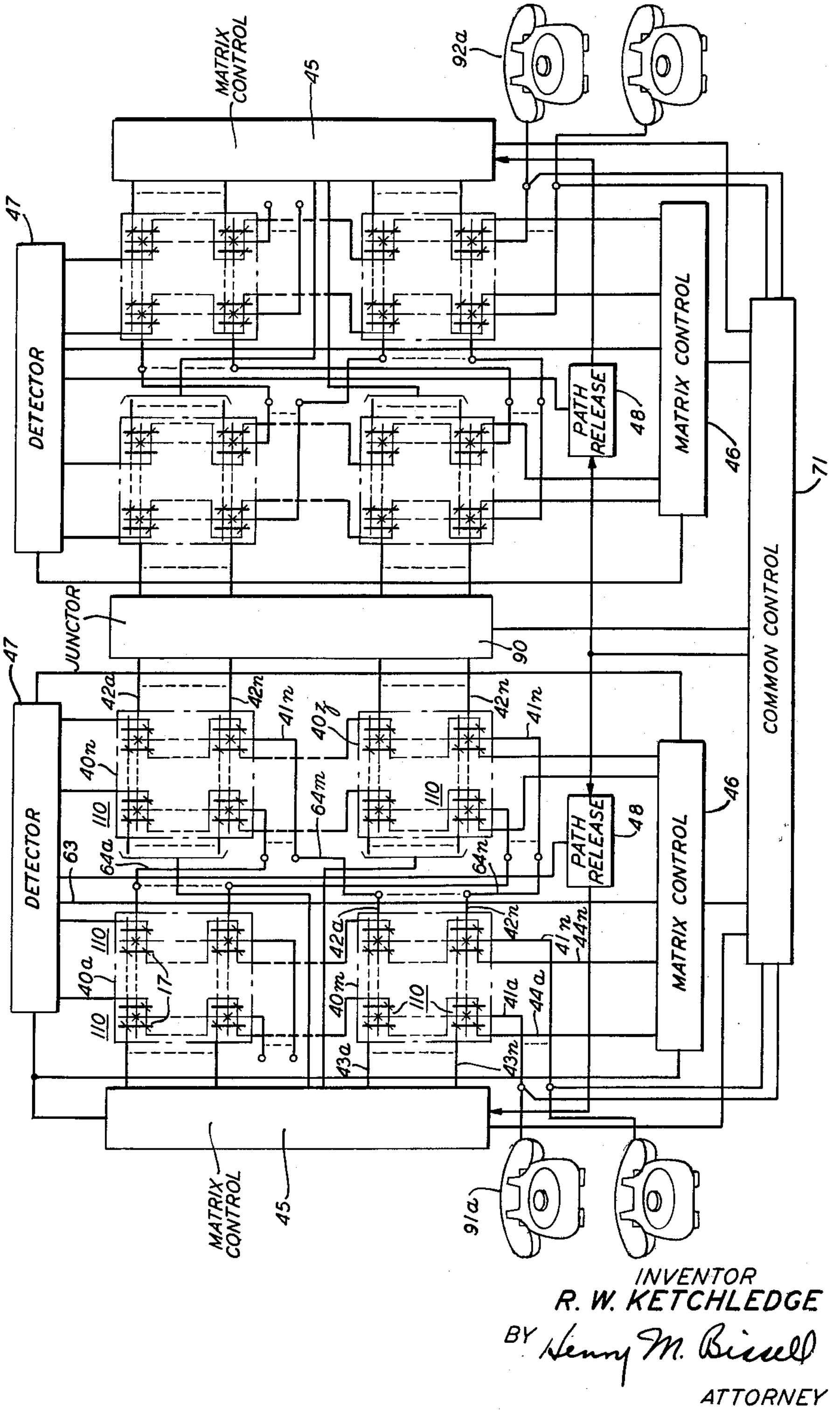
FIG. 5 represents a specific telephone network in accordance with my invention.

FIG. 4 depicts a matrix of switching devices 10 such as the relay structures 1 of FIG. 1 represented by the schematic symbols of FIG. 3. The omission of some of the matrix relays is indicated by the dashed lines connecting the depicted relays. This matrix 40 may advantageously be a part of a more extensive switching network, as depicted in FIG. 5 and described below, but for purposes of explanation only a single matrix in the network is shown in FIG. 4 and described at this time.

Matrix control circuits 45 and 46 are shown connected to the respective horizontal and vertical coordinates of the matrix. As indicated in the figure the respective control windings of the relays 10 are connected in series by groups to form the horizontal and vertical coordinate control leads 43 and 44, respectively. The readout windings 18 of the respective relays 10 are connected in vertical groups through an OR circuit 50 to a normally conducting gate 70 in the detector circuit 47.

A particular relay 10 is operated by the concurrent application of half amplitude drive pulses, such as pulses 48 and 49, from pulse sources 51 and 52, respectively, in the matrix control circuits to the corresponding coordinate leads 43 and 44 common to that relay. Release of a particular relay 10 is effected by applying a full amplitude pulse of the opposite polarity, such as pulse 54, from the pulse source 51 to a horizontal control lead 43. During the reversal of magnetization in the leg 13 of the operated relay 10, a signal is induced in the readout winding 18 which is applied to the detector circuit 47.

An appreciation of my invention may be gained from consideration of the operation of this specific illustrative embodiment in obtaining a path through the switch matrix 40. Let us assume that, in the operation of the switching network of which this matrix is a part, it is desired to find a path from the vertical speech conductor 41*a* to an idle horizontal speech conductor 42. The operation of this circuit is initiated by a start signal from the related common control circuitry, indicated by the block 71, which, as is known in the telephone art, has detected, assimilated, and stored the necessary information signals indicating that this particular path through the network is desired. This initiating pulse is applied to a stepping circuit 56 through a diode 72 and to the Reset input terminal of the pulse source 51 in the matrix control circuit 45; accordingly, the pulse source 51 generates a Reset pulse 54 and the stepping circuit 56 operates to apply an enabling control signal to one of the gate circuits 59. We shall assume that the stepping circuit at this time applies the control signal to gate 59*a*, thereby causing the Reset pulse 54 to be applied to horizontal control lead 43*a*.

If, at this time, any of the relays 10 in this first horizontal row are operated, i.e., their contacts 14 and 15 are closed, the Reset pulse 54 on lead 43*a* will reverse the magnetic state of the leg 13 of that relay, thus generating an output pulse in the readout winding 18. This output pulse is applied through the OR circuit 50 to the gate 70 of the detector circuit 47. As all of the contacts 14 of the relays of this row are connected together to the lead 42*a*, operation of any one relay in this row renders this entire row busy and unavailable for another connection. Thus all of the output leads 58 from the output windings 18 are multiplied through the OR circuit 50. Also connections from the output leads 58 are carried to individual OR circuits 62 in the matrix control circuit 46 for a purpose which will be explained below.

If an output pulse is detected by the detector 47 this is an indication that this row of relays 10 is unavailable because one relay thereof is already operated in a priorly established connection. Accordingly, a pulse is applied from the detector 47 to the Set input terminals of pulse sources 51 and 52, causing these sources to generate the Partial Set pulses 48 and 49. The output pulse directed to the detector 47 is also applied through the appropriate OR gate 62 to a corresponding gate 61 arranged between the common output connection of the pulse source 52 and the vertical control leads 44 of the relays 10. Partial Set pulse 48 is applied through the still enabled gate 59*a* to lead 43*a* while Partial Set pulse 49 is applied through the corresponding enabled gate 61 to the associated lead 44. This restores the magnetic state of the operated relay in the first row to its set condition.

The output pulse from the detector 47 is also applied through the normally enabled gate 73 and a delay circuit 60 to the Start lead again. After a slight delay introduced by delay circuit 60 to allow for the restoration of the set condition of the reset relay in the first row, the output pulse from the detector circuit 47 is applied to the stepping circuit 56 to advance that circuit one step and is also applied to the Reset terminal of the pulse source 51. The above operation is then repeated with, however, the output control signal from the stepping circuit 56 enabling gate 59*b*, not shown, to examine the availability of a relay 10 and lead 42*b* in the second row of the matrix 40.

Each of the Reset pulses 54 is additionally applied through an inverter 74 and a delay circuit 75 to an inhibiting gate 76 which is blocked by signals from the OR circuit 50 of the detector 47. Accordingly, so long as pulsing of the leads 43 produces output pulses from the OR circuit 50, thus indicating the existence of an operated relay 10 in the pulsed row of the matrix 40, no signals are passed through the gate 76. If the gate 76 is not inhibited by a pulse from the OR circuit 50, thus corresponding to the condition where all of the relays 10 in the particular row being pulsed are idle, the inverted Reset pulse 54 is passed through the gate 76. The output of the gate 76 signals the common control circuit 71 over the Connect lead to cause it to apply a signal through the OR gate 62*a* which will enable gate 61*a*. Simultaneously, the output of the gate 76 is directed through the diode 77 to the Set leads of pulse sources 51 and 52 to operate the switch 10 which provides the desired connection between the vertical lead 41*a* and the idle horizontal lead 42. At this time the gate 73 is inhibited by the output of the gate 76 so that the Set signal is not passed through the delay circuit 60 to continue the selecting cycle.

The location of the particular horizontal lead 42 involved in the subscriber path connection is passed to the common control circuit 71 which stores this information in a link release matrix 78 of the path release circuit 48. This matrix 78 may advantageously comprise a word-organized storage matrix of ferromagnetic or ferroelectric elements as is known in the art in which information storage and readout are provided in parallel along its vertical leads, one horizontal row at a time. When a subscriber talking path is to be disconnected, the common control circuit 71 applies a Release Start signal to the pulse source 79 and a Disconnect signal to the access circuit 80 within the path release circuit 48. The pulse source 79 then applies successive pulses to the translator circuit 81 and to the Advance lead of the stepping circuit 56. As the stepping circuit 56 successively enables gates 59, signals are applied to a matching circuit 82 from the stepping circuit 56 and from the translator 81. When the signals from these two circuits are matched, indicating that the stepping circuit is enabling a gate 59 at the row which is to be reset, an output pulse from the matching circuit 82 is applied to the Reset lead of pulse source 51 to effect the release of the operated relay 10 in that row. Simultaneously, the matching circuit applies a pulse to inhibit the gate 70 in the detector 47 to prevent the application of signals to the Set leads of the pulse sources 51 and 52 which would otherwise initiate the path selecting cycle described above. The output of the matching circuit 82 also discontinues the operation of the pulse source 79 and indicates to the common control circuit 71 that the particular link has been released.

FIG. 5 represents a switching network in accordance with my invention of which the circuit of FIG. 4 may comprise a portion. This figure depicts a network comprising a plurality of matrices 40 interconnected by links 64 and arranged in two symmetrical sections which are joined, as is known in the telephone art, by a junctor circuit 90 controlled by the common control circuit 71. In FIG. 5 the individual switch contacts are represented by *x* symbols as is common in switching diagrams to show a normally open contact pair.

Each of the two halves of the network of FIG. 5 operates essentially as has been described with respect to the circuit of FIG. 4 with one exception. It has already been noted in the description of the relay 1 of FIG. 1 that the release of the switch contacts is effected by the application of a single Reset pulse to the winding 6. Since during this time the reversal of flux linking it generates an output pulse on the winding 7, to which the winding 17 of FIG. 3 corresponds, this pulse is applied to the detector circuit 47 in the embodiment of my invention depicted in FIG. 5. As the readout pulse is developed in this fashion, it is unnecessary to provide separate readout windings, such as winding 18 of FIG. 3, and, accordingly, the relays 110 employed in the matrices 40 of the switching network depicted in FIG. 5 do not include a special readout winding. In this specific embodiment of my invention an arrangement for distinguishing in the detectors 47 between a readout signal from a winding 17 and a Partial Set pulse applied to the windings 17 is advantageously provided by the leads 63 which carry inhibiting signals from the matrix control circuits 46. These signals may be used, as is known in the art, to inhibit the detector circuit 47 during the application of the Partial Set pulse from matrix control circuit 46. If it is preferred, however, the relays 10 employed in the specific embodiment of my invention depicted in FIG. 4 may be used throughout the switching network of FIG. 5, thus permitting complete separation of the readout and control circuits.

In considering the operation of the network of FIG. 5, let us assume that a connection is to be provided between telephone sets 91*a* and 92*a*. Further, let us assume that all of the horizontal leads 42 of the switches in the matrix 40*n* in the second switching stage of the left half of the network are in use and that the horizontal switch connection 42*a* of the matrix 40*m* is idle. In the manner already described, Reset pulses are applied to successive horizontal control leads 43 of the matrix 40*m* in which the telephone set 91*a* is connected. Since the horizontal switch lead 42*a* is idle, this state is detected and the upper left-hand relay 110 of the matrix 40*m* is thereupon operated to provide a connection from the telephone set 91*a* over the connecting link 64*m* to the vertical switch lead 41*a* of matrix 40*n*. Matrix control circuit 45 now proceeds to apply pulses to the horizontal control leads 43 of the matrix 40*n* in a search for an idle horizontal switch lead 42 thereof. Since all of these are assumed busy, however, this condition will be indicated to the common control circuit 71 after all of the leads 43 of the matrix 40*n* have been interrogated. Accordingly, the common control circuit 71 causes the path release circuit 48 to release the operated relay 110 of the matrix 40*m* and the selection process continues with the matrix control circuit 45 pulsing succeeding horizontal control leads 43 of the matrix 40*m*.

Let us assume that the horizontal switch lead 42*n* of the matrix 40*m* is found idle. Accordingly, the lower left-hand relay 110 of the matrix 40*m* will thereupon be operated, thus connecting the telephone set 91*a* over a link 64*n* to the vertical switch lead 41*n* of matrix 40*z*. As before, the matrix control circuit 45 interrogates the horizontal control leads of this matrix until an idle horizontal switch lead 42*n* is located. Thereafter, the appropriate relay 110 of the matrix 40*z* will be operated, completing the path from the telephone set 91*a* to the junctor 90. Simultaneously with the above-described operation, a similar procedure is followed in the portion of the network to the right of the junctor 90 to provide a path from the telephone set 92*a* to the junctor. Assuming these paths can be matched together within the junctor 90, the junctor completes the connection and the desired talking path between telephone sets 91*a* and 92*a* is established. In the event such a match cannot be provided, the individual path selection process is continued until a match is achieved or, in the alternative, a Busy signal is sent to the subscriber indicating the present unavailability of the requested connection.

When a telephone subscriber terminates a conversation by hanging up a telephone, the resulting change in switch-hook condition is detected in the common control circuit 71 which thereupon signals the path release circuit 48 to release the particular links of the network involved in that subscriber connection. Path release circuits 48 proceed in the manner already described with reference to FIG. 4 to cause the matrix control circuits 45 and 46 to operate until the particular links are released and ready for use in completing other telephone connections.

Thus it will be noted that, in accordance with my invention, a switching network is advantageously provided which utilizes relays which are compatible with control pulses shorter than the response time of the relay contacts themselves. In accordance with an aspect of my invention, this property of relays of this type is employed to advantageously reduce the external information storage circuitry accessory to the switching matrices per se. This desirable result is accomplished by utilizing the magnetization states of the individual switching relays to indicate the contact conditions thereof without disturbing the switch contacts.

It is to be understood that the above-described arrangements are illustrative of the principles of the invention. Numerous other arrangements may be devised by those skilled in the art without departing from the spirit and scope of the invention.

What is claimed is:

1. A switching network for providing connections between first and second pluralities of telephone lines comprising a plurality of switches, means for controlling said switches comprising magnetic members of a material exhibiting a plurality of stable remanent magnetization states, means for applying particular signals to said switches to reverse the remanent magnetization state of an operated switch, means for generating a readout signal upon said reversal, and means for detecting said readout signal and for applying signals to said operated switch to restore said reversed magnetization state before the contact condition of said switch changes.

2. A switching network in accordance with claim 1 wherein said signal applying means comprises a plurality of control windings about said magnetic members.

3. A switching network in accordance with claim 2 wherein said readout signal generating means includes a readout winding about one of said members.

4. A switching network in accordance with claim 2 wherein means are provided for reading out the signal generated by one of said control windings during the reversal of remanent magnetization in said magnetic member.

5. A telephone switching network comprising a plurality of subscriber telephone sets, means for providing connections between particular ones of said telephone sets including a plurality of switching devices, means for controlling said switching devices including a plurality of remanently magnetic members of a material exhibiting two stable remanent magnetization states, and means for determining the existence of connections within said switching network comprising means for selectively establishing particular remanent magnetization states in said members, means for detecting readout signals indicating the reversal of magnetization in said particular switching devices and means for restoring the previously existing magnetization states of said particular switching devices upon the detection of said readout signals.

6. A communication system comprising a plurality of lines, a plurality of links, switching means having a pair of contacts for connecting one of said lines to one of said links, means for controlling the condition of said contacts comprising a magnetic member of a material having two stable states of magnetic remanence, and means for determining if said line is connected to said link without disturbing the condition of said switch contacts, said last-mentioned means comprising first means coupled to said member for detecting a change of state in said member and second means coupling said first means to said member for effecting a change in the state of remanence of said member.

7. In a telephone switching network comprising a plurality of magnetically responsive switching devices, means for determining the magnetic state of said devices comprising means for establishing a particular magnetic state in predetermined ones of said devices, means for detecting the reversal of magnetization condition of one of said predetermined devices, and means for restoring the pre-existing magnetization condition of said one device in which a magnetization reversal occurs without disturbing the contact state of said switching devices.

8. In a telephone switching network, the combination set forth in claim 7 wherein said detecting means comprises a readout winding for generating a signal upon said reversal of magnetization condition.

9. In a telephone switching network, the combination in accordance with claim 8 wherein said readout winding is connected to said restoring means during the restoration of said pre-existing magnetization condition.

10. A telephone switching network comprising a plurality of relays having a pair of contacts and magnetic members exhibiting two stable remanent magnetization states, means for operating particular ones of said relays to provide connections through said network, and means for preventing the interruption of one of said connections comprising means for establishing a predetermined magnetization state of selected ones of said relays, means for detecting the reversal of magnetization state of any one of said selected relays, and means for restoring the magnetization state thereof existing prior to said reversal without disturbing the contacts of said relay.

11. A telephone switching network comprising a plurality of relays for providing connections through said network, said relays including a pair of contacts and magnetic elements of a material exhibiting a plurality of stable remanent magnetization states, means for selectively controlling said magnetization states, and means for selectively establishing said connections through said network without interrupting pre-established connections comprising pulse means for producing a particular magnetization state in said relays, readout means individually associated with each of said relays for indicating a reversal of magnetization state and detection means for causing said pulse means to restore the magnetization state existing prior to said reversal in response to a signal from said readout means.

12. A switching network in accordance with claim 11 wherein said readout means comprises an individual readout winding about one magnetic element of each of said relays.

13. A switching network in accordance with claim 11 wherein said readout means comprises a control winding which is active in establishing only one of said plurality of stable remanent magnetization states.

14. A communication switching network comprising a plurality of switches, control means for each of said switches including magnetic members having a pair of stable states of magnetic remanence, and means for determining an idle path through said network comprising means for applying release pulses to said control means of successive ones of said switches, means for detecting readout pulses on the switching of the remanent states of said magnetic members of switches being employed in a prior path through said network, means responsive to said detecting means for restoring the remanent states of said magnetic members thus employed prior to operation of their associated switches, and means for detecting the absence of a readout pulse after the application of a release pulse, thereby identifying an idle path through said network.

15. A communication switching network in accordance with claim 14 further comprising means responsive to said means for detecting the absence of the readout pulse for applying operating signals to the control means of the desired switch in said idle path.

16. A communication switching network in accordance with claim 15 wherein said switches are arranged in a coordinate array and said control means further includes control windings on said remanent magnetic members, said release pulses being applied to windings in one coordinate of said array and said switches being operated and restored to their operated state by partial operate pulses applied to windings in both coordinates of said array.

No references cited.